(12) United States Patent
Kim et al.

(10) Patent No.: US 8,785,038 B2
(45) Date of Patent: Jul. 22, 2014

(54) NEGATIVE ELECTRODE ACTIVE MATERIAL

(75) Inventors: Jae Woong Kim, Gunpo-si (KR); Seung Chul Lee, Seoul (KR); Ki Duck Park, Ansan-si (KR); Chul Gyu Bae, Suwon-si (KR); Jong Goo Kang, Ansan-si (KR); Yoon Seong Cho, Seoul (KR)

(73) Assignee: Iljin Electric Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/813,018

(22) PCT Filed: Nov. 19, 2010

(86) PCT No.: PCT/KR2010/008183
§ 371 (c)(1), (2), (4) Date: Jan. 29, 2013

(87) PCT Pub. No.: WO2012/015105
PCT Pub. Date: Feb. 2, 2012

(65) Prior Publication Data
US 2013/0130101 A1 May 23, 2013

(30) Foreign Application Priority Data
Jul. 30, 2010 (KR) .................. 10-2010-0074314

(51) Int. Cl.
*H01M 4/134* (2010.01)
*H01M 4/58* (2010.01)
*H01M 4/38* (2006.01)
*H01M 4/525* (2010.01)
*H01M 10/0525* (2010.01)
*H01M 4/36* (2006.01)

(52) U.S. Cl.
CPC .............. *H01M 4/386* (2013.01); *H01M 4/581* (2013.01); *H01M 4/134* (2013.01); *H01M 4/38* (2013.01); *Y02E 60/122* (2013.01); *H01M 4/525* (2013.01); *H01M 10/0525* (2013.01); *H01M 4/364* (2013.01)
USPC ........................................................ 429/188

(58) Field of Classification Search
None
See application file for complete search history.

(56) References Cited

U.S. PATENT DOCUMENTS

2007/0048611 A1* 3/2007 Yamamoto et al. ........... 429/224
2007/0082266 A1* 4/2007 Waki et al. .................... 429/224

FOREIGN PATENT DOCUMENTS

JP 2006-164960 A 6/2006

* cited by examiner

*Primary Examiner* — Patrick Ryan
*Assistant Examiner* — Wyatt McConnell
(74) *Attorney, Agent, or Firm* — Hammer & Associates, P.C.

(57) ABSTRACT

A negative electrode active material and a secondary battery are provided. The negative electrode active material can be useful in maintaining excellent cell efficiency and lifespan while showing high-capacity properties, and the secondary battery may be manufactured using the negative electrode active material.

8 Claims, 5 Drawing Sheets

NEGATIVE ELECTRODE ACTIVE MATERIAL

CROSS-REFERENCE TO RELATED APPLICATION

This application claims priority to and the benefit of Korean Patent Application No. 2010-0074314, filed Jul. 30, 2010, the disclosure of which is incorporated herein by reference in its entirety.

BACKGROUND

1. Field of the Invention

The present invention relates to a negative electrode active material and a secondary battery.

2. Discussion of Related Art

A secondary battery is a chemical cell that can be repeatedly charged and discharged using an electrochemical reaction. One representative example of the secondary battery is a lithium secondary battery. In a lithium secondary battery, for example, a carbon-based material such as graphite is used for a negative electrode, a lithium-containing compound is used for a positive electrode, and a lithium salt is used for an electrolyte.

Portable electronic equipment is provided with a device having high power consumption, such as a central processing unit (CPU) and a liquid crystal display device (LCD), and shows increasing power consumption with multifunctionality. Therefore, a lithium secondary battery frequently used as an electric power source of the electronic equipment is required to realize a high-capacity design. As a widely used negative electrode active material, however, graphite has a problem in that it is difficult to achieve a high charge/discharge capacity.

Accordingly, as an alternative to a carbon-based negative electrode active material, research on a metallic material that can introduce and deintercalate lithium ions has been conducted, and much attention has been paid to silicon (Si) and tin (Sn) as the alternative to the carbon-based negative electrode active material.

However, a cell using silicon (Si) as a negative electrode material has a problem in that an expansion in volume of the silicon (Si) may take place during a charge cycle when lithium ions transferred to the negative electrode are intercalated into the silicon (Si). Also, the lithium ions are deintercalated from the silicon (Si) during a discharge cycle, which leads to re-contraction of the silicon (Si). As a result, a metal is ground into a powder and a cycle property may be degraded as the charge/discharge cycle is repeatedly carried out.

Japanese Patent Laid-open Publication No. 2006-286312 disclosed a lithium secondary battery using a silicon thin film formed through a dry process as a negative electrode active material. In Japanese Patent Laid-open Publication No. 2006-286312, the silicon thin film has a structure which is separated in a main phase according to a short circuit formed in a thickness direction thereof. In Japanese Patent Laid-open Publication No. 2006-286312, there have been attempts conducted to reduce the expansion and contraction of silicon (Si) using a physical shape of a silicon thin film, but the productivity of the thin film is severely lowered, which makes it difficult to apply the thin film to mass production of cells.

SUMMARY OF THE INVENTION

The present invention is directed to providing a negative electrode active material and a secondary battery.

One aspect of the present invention provides a negative electrode active material including a phase A including active silicon, and a phase B having a metal alloy matrix including silicon and a transition metal. Here, the negative electrode active material satisfies the requirements of the following Expression 1.

$$X \geq 500 \text{ Hv} \qquad \text{Expression 1}$$

In Expression 1, X represents a Vickers hardness of the alloy matrix, as measured at 100 gf.

Another aspect of the present invention provides a negative electrode active material including a phase A including active silicon, and a phase B having a metal alloy matrix including silicon and a transition metal. Here, the same peaks other than peaks derived from the active silicon of the phase A when an ex situ X-ray diffraction (XRD) analysis is carried out before a charge/discharge cycle are observed after the charge/discharge cycle.

Hereinafter, the negative electrode active material according to exemplary embodiments of the present invention will be described in further detail.

The negative electrode active material according to one exemplary embodiment of the present invention includes a phase A including active silicon, preferably a phase A formed only of active silicon, and a phase B having an alloy matrix including silicon and another transition metal. The negative electrode active material according to one exemplary embodiment of the present invention may have a structure in which the active silicon of the phase A forms a core and the alloy matrix of the phase B surrounds the core of the active silicon of the phase A. In the present invention, the metal alloy matrix of the phase B may be present in the form of a band having an average thickness of approximately 10 to 100 nm. The negative electrode active material according to one exemplary embodiment of the present invention may have a structure in which a large amount of fine active silicon particles are present in the negative electrode active material and the active silicon particles are firmly connected by means of the metal alloy matrix to surround the active silicon of the phase A with the metal alloy matrix of the phase B. In the present invention, the alloy matrix shows both high hardness and an embrittlement property due to its innate alloy composition, and has excellent electric conductivity and an electrochemical property. According to the fine structure of the active material according to one exemplary embodiment of the present invention, expansion of a pole plate may be effectively suppressed during a charge/discharge cycle, and a lifespan property may be ensured. Therefore, the negative electrode active material according to one exemplary embodiment of the present invention may be applied to a secondary battery to show excellent performance.

In the present invention, the phase A includes active silicon as a main component, and preferably includes only active silicon. That is, the phase A may be formed of a single phase of the active silicon so as to maximize an amount of the intercalated lithium ions when the negative electrode active material is applied to a secondary battery.

In the present invention, the active silicon included in the phase A may have a shape in which appearance is uniformly smooth, for example, a particle shape, etc., but the present invention is not limited thereto. Also, the active silicon of the phase A may have dispersed particles, or the silicon particles may be partially formed in a continuous manner.

In the present invention, the active silicon included in the phase A may have an average particle diameter of 1,000 nm or less, preferably 100 nm to 500 nm, and more preferably 10 nm to 100 nm. When the particle diameter of the active silicon of the phase A is too high, a thickness of the metal alloy matrix may be reduced, and cracks may appear in the phase A during a charge/discharge cycle, causing an electrical short circuit. Therefore, when the average particle diameter of the active silicon is controlled within this range, the cracks may be prevented from appearing in the phase A.

In the active material according to one exemplary embodiment of the present invention, a ratio of the active silicon of the phase A is not particularly limited. For example, the active silicon of the phase A may be included at a ratio of approximately 30 to 80 atom %, based on the total amount of elements included in the active material. When the ratio of the active silicon of the phase A is controlled within this range, the secondary battery may have a high-capacity property and also maintain excellent cell efficiency and lifespan when the active material is applied to the secondary battery.

The active material according to one exemplary embodiment of the present invention includes a phase B including a metal alloy matrix. In the present invention, the matrix includes silicon as a constituent element of the matrix. In the present invention, the silicon included in the matrix of the phase B may be basically distinguished from the active silicon included in the phase A. That is, the alloy matrix of the phase B may include silicon and a (binary) metal alloy of two or more components, preferably a (ternary) metal alloy of three or more components including at least one transition metal as an alloy component in addition to the silicon.

In the present invention, when the matrix included in the phase B is, for example, applied to a secondary battery, the matrix does not substantially have reactivity with lithium that is a component included in the electrolyte of the secondary battery, or ions thereof. In the present invention, the expression "having substantially no reactivity" means a case in which the matrix does not react with lithium or ions thereof at all, or a case in which the matrix has too low reactivity with lithium or ions thereof to affect desired effects of the present invention, even when it is somewhat reactive with lithium or ions thereof. As described above, the active silicon of the phase A and the matrix of the phase B which does not show reactivity with lithium may effectively suppress expansion and contraction of the active silicon of the phase A, and also may improve characteristics such as cycle property, efficiency and lifespan when the active material is applied to cells. More particularly, the same peaks other than peaks derived from the active silicon of the phase A when an ex situ XRD analysis on the active material according to one exemplary embodiment of the present invention is carried out before a charge/discharge cycle are observed in the active material after the charge/discharge cycle. As such, the term "the same peaks being observed" means that peaks other than peaks derived from the active silicon of the phase A, that is, peaks derived from the metal alloy matrix of the phase B, are observed at the same diffraction angle without the peaks shifting after the charge/discharge cycle when an ex situ XRD is performed on the active material before a charge/discharge cycle. In this case, it is defined that, although the peaks are changed in height by influence of strain generated by the charge/discharge cycle, the total peaks are observed to have substantially the same area. In the present invention, the conditions required for the charge/discharge cycle and the ex situ XRD analysis are not particularly limited. For example, the charge/discharge cycle and the ex situ XRD analysis may be performed using a method known in the related art, and, more particularly, a method described in Examples of this specification. Typically, the peaks derived from the active silicon of the phase A in the ex situ XRD analysis are observed at diffraction angles (2Θ) of approximately 28.8° and approximately 47.8°, and the peaks other than the peaks derived from the active silicon of the phase A may be, for example, peaks observed at a diffraction angle (2Θ) of greater than approximately 28.8° and less than approximately 47.8° during the ex situ XRD analysis.

In the present invention, the matrix included in the phase B includes silicon (Si) as a constituent element of the alloy, as described above. Therefore, the matrix shows sufficiently high hardness to effectively suppress expansion or contraction depending on which lithium ions are intercalated or deintercalated.

More particularly, the negative electrode active material according to one exemplary embodiment of the present invention shows a high hardness represented by Expression 1 due to the distinctive matrix compositions as described above.

More particularly, the active material according to one exemplary embodiment of the present invention may have a Vickers hardness X of 500 Hv or more, preferably 600 Hv or more, more preferably 800 Hv or more, and further preferably 1,000 Hv, as measured at a load of 100 gf. In the present invention, the upper limit of the Vickers hardness X is not particularly limited, and may be, for example, the same as or less than 2,000 Hv.

The active material according to one exemplary embodiment of the present invention shows an excellent hardness property as represented by Expression 1, and thus may effectively suppress expansion of a pole plate and improve efficiency and lifespan of cells when the active material is applied to a lithium secondary battery.

In the present invention, a method of measuring the Vickers hardness is not particularly limited. For example, the Vickers hardness may be measured using a conventional Vickers hardness measuring method known in the art, and, more particularly, using a method described in Examples of this specification.

The active material according to one exemplary embodiment of the present invention shows an excellent embrittlement property in addition to the high Vickers hardness as described above. More particularly, the active material may satisfy the requirements of the following Expression 2, as well as the requirements of Expression 1.

$$Y \leq 15 \, \mu m \hspace{2cm} \text{Expression 2}$$

In Expression 2, Y represents a $D_{50}$ value of a milled product as measured after the active material is milled for 24 hours using a ball mill machine.

The active material according to one exemplary embodiment of the present invention may have a Y ($D_{50}$) value of 10 μm or less. In the present invention, the lower limit of the $D_{50}$ value (Y) is not particularly limited, and may be, for example, the same as or greater than 2 μm.

As defined in Expression 2, since the active material according to one exemplary embodiment of the present invention shows the excellent embrittlement property, manufacturing efficiency and productivity of cells may be maximized while improving cell efficiency and lifespan of the cells.

In the present invention, conditions required to mill the active material and a method of measuring a $D_{50}$ value may be set and performed using a method described in Examples of this specification.

The active material according to one exemplary embodiment of the present invention also shows excellent electric conductivity due to the distinctive matrix compositions. More particularly, the active material according to one exemplary embodiment of the present invention may have an electric conductivity of $5 \times 10^1$ S/cm or more, preferably $5.5 \times 10^1$ S/cm or more, and more preferably $6 \times 10^1$ S/cm or more, as measured at a load of 20 kN. The upper limit of the electric conductivity of the active material according to one exemplary embodiment of the present invention is not particularly limited, and may be, for example, the same as or less than $20 \times 10^1$ S/cm.

Since the active material according to one exemplary embodiment of the present invention shows the excellent electric conductivity, the efficiency and lifespan of cells may be improved when the active material is applied to a secondary battery.

Meanwhile, in the present invention, the electric conductivity described above may be measured using a conventional method known in the related art, and, more particularly, a method provided in Examples of this specification.

Kinds of transition metals included as alloy elements together with silicon (Si) in the matrix according to one exemplary embodiment of the present invention are not particularly limited as long as they can form an alloy with silicon (Si) and show no reactivity with active silicon (Si) of the phase A and components of the electrolyte after formation of the alloy. In the present invention, the transition metal may be, for example, at least one selected from the group consisting of zinc (Zn), cobalt (Co), nickel (Ni), iron (Fe), zirconium (Zr), chromium (Cr), phosphorus (P), copper (Cu), phosphorus (P) (중복), vanadium (V), manganese (Mn), niobium (Nb), molybdenum (Mo), titanium (Ti) and cerium (Ce). Especially in the present invention, the transition metal may be at least one selected from the group consisting of Ti and Fe, and Ti and Fe are more preferred. That is, in the present invention, the metal alloy matrix may be a Si—Ti—Fe ternary alloy, but the present invention is not limited thereto.

In the active material according to one exemplary embodiment of the present invention, the metal alloy matrix may be included at a ratio of 20 atom % to 70 atom %. In the present invention, when the ratio of the metal alloy matrix is adjusted as described above, the matrix may effectively surround the phase A in the form of a band, so that the active material shows a high-capacity property.

In the present invention, the phase A and the phase B may be present in the form of an alloy. More preferably, the active material may be present in the form of an alloy represented by the following Formula 1.

aSi-bTi-cFe        Formula 1

In Formula 1, a, b and c are represented by the unit "atom %", and the sum of a, b and c is 100 atom %.

In Formula 1, a represents an atomic ratio of the sum of silicon in the active material present in the form of an alloy, particularly, active silicon of the phase A, and silicon included in the matrix of the phase B. Here, the atomic ratio may be in a range of 30 to 80 atom %, preferably 50 to 80 atom %. Also, b in Formula 1 represents an atomic ratio of titanium (Ti) included in the matrix. Here, the atomic ratio of titanium (Ti) may be in a range of 0 to 35 atom %, preferably 10 to 25 atom %. In addition, c in Formula 1 represents an atomic ratio of iron (Fe) included in the matrix. Here, the atomic ratio of iron (Fe) may be in a range of 0 to 35 atom %, preferably 10 to 25 atom %. In the present invention, when the ratio of the constituent element in the active material is controlled as described above, the active material may be applied to a secondary battery to show excellent cycle and efficiency properties.

In the present invention, both of the phase A (active silicon) and the phase B (metal alloy matrix) may be present in a crystalline form. When both of the phase A and the phase B are present in a crystalline form, excellent initial efficiency of a secondary battery may be especially maintained.

A method of preparing the negative electrode active material according to one exemplary embodiment of the present invention is not particularly limited. For example, the active material may be prepared using various alloying techniques known in the related art. In the present invention, the active material may be, for example, prepared using a quenching method, which includes mixing silicon and components constituting the metal matrix, melting the resulting mixture using an arc melting method, and dispersing the molten product in a rotating kappa roll. However, the method applicable to the present invention is not limited thereto. In addition to the ribbon quenching method, any methods may be used without limitation as long as they can be used to achieve a sufficient quenching rate. In the present invention, a desired negative electrode active material may be prepared by adjusting the kinds and blending ratios of the compositions of the alloy elements used in the various methods as described above.

Still another aspect of the present invention provides a secondary battery including a positive electrode, a negative electrode including the active material according to one exemplary embodiment of the present invention, and an electrolyte.

The kind of the positive electrode that may be used in the secondary battery of the present invention is not particularly limited. For example, a material that can perform an electrochemically reversible redox reaction may be used as the positive electrode. In the present invention, for example, a lithiated intercalation compound may be used.

Examples of the above-described compound that may be used in the present invention may include at least one compound selected from the group consisting of the following Formulas 2 to 25, but the present invention is not limited thereto.

$Li_a A_{1-b} B_b D_2$        Formula 2

In Formula 2, a is in a range of 0.95 to 1.1, and b is in a range of 0 to 0.5:

$Li_a E_{1-b} B_b O_{2-c} F_c$        Formula 3

In Formula 3, a is in a range of 0.95 to 1.1, b is in a range of 0 to 0.5, and c is in a range of 0 to 0.05:

$LiE_{2-b} B_b O_{4-c} R_c$        Formula 4

In Formula 4, b is in a range of 0 to 0.5, and c is in a range of 0 to 0.05:

$Li_a Ni_{1-b-c} Co_b B_c D_\alpha$        Formula 5

In Formula 5, a is in a range of 0.95 to 1.1, b is in a range of 0 to 0.5, c is in a range of 0 to 0.05, and α is greater than 0 and less than or equal to 2:

$Li_a Ni_{1-b-c} CO_b B_c O_{2-\alpha} F_\alpha$        Formula 6

In Formula 6, a is in a range of 0.95 to 1.1, b is in a range of 0 to 0.5, c is in a range of 0 to 0.05, and α is greater than 0 and less than 2:

$Li_a Ni_{1-b-c} Co_b B_c O_{2-\alpha} F_2$        Formula 7

In Formula 7, a is in a range of 0.95 to 1.1, b is in a range of 0 to 0.5, c is in a range of 0 to 0.05, and α is greater than 0 and less than 2:

$Li_a Ni_{1-b-c} Mn_b B_c D_\alpha$        Formula 8

In Formula 8, a is in a range of 0.95 to 1.1, b is in a range of 0 to 0.5, c is in a range of 0 to 0.05, and a is greater than 0 and less than or equal to 2:

$Li_a Ni_{1-b-c} Mn_b B_c O_{2-\alpha} F_\alpha$        Formula 9

In Formula 9, a is in a range of 0.95 to 1.1, b is in a range of 0 to 0.5, c is in a range of 0 to 0.05, and α is greater than 9 and less than 2:

$$Li_aNi_{1-b-c}Mn_bB_cO_{2-\alpha}F_2 \quad \text{Formula 10}$$

In Formula 10, a is in a range of 0.95 to 1.1, b is in a range of 0 to 0.5, c is in a range of 0 to 0.05, and α is greater than 0 and less than 2:

$$Li_aNi_bE_cG_dO_2 \quad \text{Formula 11}$$

In Formula 11, a is in a range of 0.90 to 1.1, b is in a range of 0 to 0.9, c is in a range of 0 to 0.5, and d is in a range of 0.001 to 0.1:

$$Li_aNi_bCo_cMn_dGeO_2 \quad \text{Formula 12}$$

In Formula 12, a is in a range of 0.90 to 1.1, b is in a range of 0 to 0.9, c is in a range of 0 to 0.5, d is in a range of 0 to 0.5, and e is in a range of 0.001 to 0.1:

$$Li_aNiG_bO_2 \quad \text{Formula 13}$$

In Formula 13, a is in a range of 0.90 to 1.1, and b is in a range of 0.001 to 0.1:

$$Li_aCoG_bO_2 \quad \text{Formula 14}$$

In Formula 14, a is in a range of 0.90 to 1.1, and b is in a range of 0.001 to 0.1:

$$Li_aMnG_bO_2 \quad \text{Formula 15}$$

In Formula 15, a is in a range of 0.90 to 1.1, and b is in a range of 0.001 to 0.1:

$$Li_aMn_2G_bO_4 \quad \text{Formula 16}$$

In Formula 16, a is in a range of 0.90 to 1.1, and b is in a range of 0.001 to 0.1:

$$QO_2 \quad \text{Formula 17}$$

$$QS_2 \quad \text{Formula 18}$$

$$LiQS_2 \quad \text{Formula 19}$$

$$V_2O_5 \quad \text{Formula 20}$$

$$LiV_2O_5 \quad \text{Formula 21}$$

$$LiIO_2 \quad \text{Formula 22}$$

$$LiNiVO_4 \quad \text{Formula 23}$$

$$Li_{(3-f)}J_2(PO_4)_3 \quad \text{Formula 24}$$

In Formula 24, f is in a range of 0 to 3.

$$Li_{(3-f)}Fe_2(PO_4)_3 \quad \text{Formula 25}$$

In Formula 25, f is in a range of 0 to 2.

In Formulas 2 to 25, A may be one or a combination of two or more selected from the group consisting of Ni, Co and Mn, B may be one or a combination of two or more selected from the group consisting of Al, Ni, Co, Mn, Cr, Fe, Mg, Sr, V and a rare-earth element, D may be one or a combination of two or more selected from the group consisting of O, F, S and P, E may be one or a combination of two selected from the group consisting of Co and Mn, F may be one or a combination of two or more selected from the group consisting of F, S and P, G may be one or a combination of two or more selected from the group consisting of Al, Cr, Mn, Fe, Mg, La, Ce, Sr and V, Q may be one or a combination of two or more selected from the group consisting of Ti, Mo and Mn, I may be one or a combination of two or more selected from the group consisting of Cr, V, Fe, Sc and Y, and J may be one or a combination of two or more selected from the group consisting of V, Cr, Mn, Co, Ni and Cu.

In addition to the above-described elements, elemental sulfur ($S_8$) and a sulfur compound may also be used in the present invention. Here, examples of the sulfur compound that may be used herein may include $Li_2S_n$ (n≥1), $Li_2S_n$ (n≥1) dissolved in a catholyte, an organic sulfur compound, or a carbon-sulfur polymer (($C_2S_f)_n$: f=2.5 to 50, n≥2).

Also, the kinds of electrolytes included in the secondary battery according to one exemplary embodiment of the present invention are not particularly limited, and typical electrolytes known in the related art may be selected and used. According to one exemplary embodiment of the present invention, the electrolyte may include a non-aqueous organic solvent and a lithium salt. As such, the lithium salt may be dissolved in an organic solvent so that it can serve as a lithium ion source in a cell, and may promote transfer of lithium ions between the positive electrode and the negative electrode. Examples of the lithium salt that may be used in the present invention may include one or two or more of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein x and y are natural numbers), LiCl, LiI, and lithium bisoxalate borate as a supporting electrolyte salt. A concentration of the lithium salt in the electrolyte may vary according to applications. Typically, the lithium salt may be used at a concentration of 0.1 to 2.0 M.

As such, the organic solvent may also serve as a medium through which ions taking part in an electrochemical reaction of a cell can move. Examples of the organic solvent may include, but are not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R represents a linear, branched or cyclic hydrocarbon group having 2 to 50 carbon atoms, provided that the hydrocarbon group may contain a double bond, an aromatic ring or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide or mevalonolactone, which may be used alone or in combination.

In addition to the above-described elements, the secondary battery according to one exemplary embodiment of the present invention may further include a conventional element such as a separator, a can, a cell case or a gasket. In this case, specific kinds of the conventional element are not particularly limited.

Also, the secondary battery according to one exemplary embodiment of the present invention includes the elements as described above. Therefore, the secondary battery according to one exemplary embodiment of the present invention may be manufactured in a typical shape known in the related art using a typical method known in the related art. Examples of the shape of the secondary battery according to one exemplary embodiment of the present invention may include a tubular shape, a horn shape, a coin shape or a pouch shape, but the present invention is not limited thereto.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
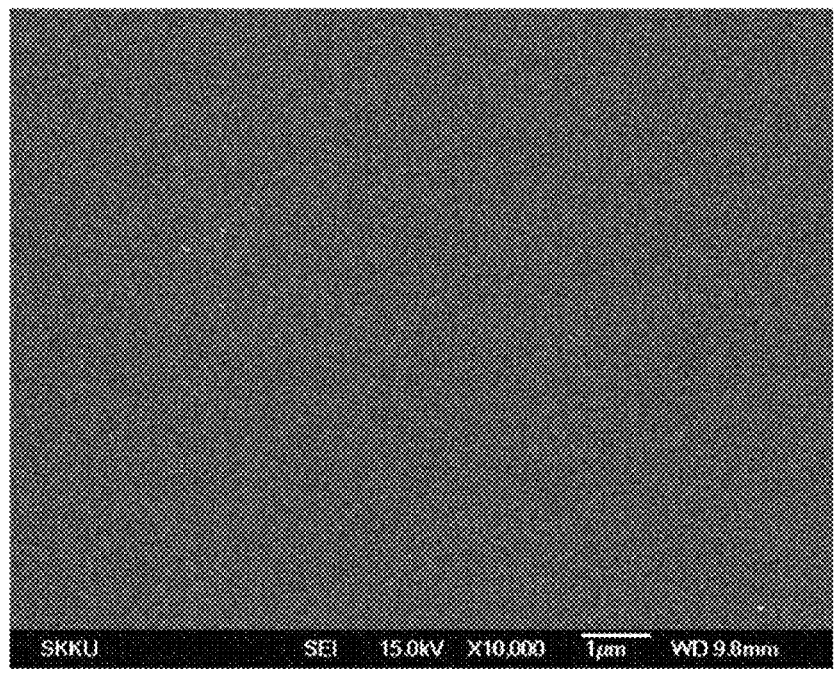
FIGS. 1 to 3 show the results obtained by measuring negative electrode active materials prepared in Examples using scanning electron microscopy (SEM) and transmission electron microscopy (TEM)

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, unless particularly stated otherwise in this specification, the unit "%" means "atom %".

EXAMPLE 1

Silicon (Si), titanium (Ti) and iron (Fe) were mixed (Si:Ti:Fe=67%:16.5%:16.5%), and the resulting mixture was melted under argon gas using an arc melting method to prepare a Si—Ti—Fe crystalline alloy. The prepared alloy was subjected to a quenching method such as melt spinning, thereby preparing a negative electrode active material in which active silicon (Si) particles (phase A) were disposed in the Si—Ti—Fe alloy matrix (phase B) in a band shape. In the melt spinning method, the quenching rate (a rate of rotation of a kappa roll) was approximately 3,500 rpm.

EXAMPLE 2

A negative electrode active material was prepared in the same manner as in Example 1, except that the mixing ratio (Si:Ti:Fe) was altered to 70%:15%:15%.

EXAMPLE 3

A negative electrode active material was prepared in the same manner as in Example 1, except that the mixing ratio (Si:Ti:Fe) was altered to 74%:13%:13%.

COMPARATIVE EXAMPLE 1

A negative electrode active material including a phase A including active silicon (Si) and a phase B including a Ti—Ni matrix was prepared in the same manner as in Example 1, except that silicon (Si), titanium (Ti) and nickel (Ni) were mixed at a blending ratio of 70%:15%:15% (Si:Ti:Ni).

1. SEM and TEM Analysis

Figure 2:
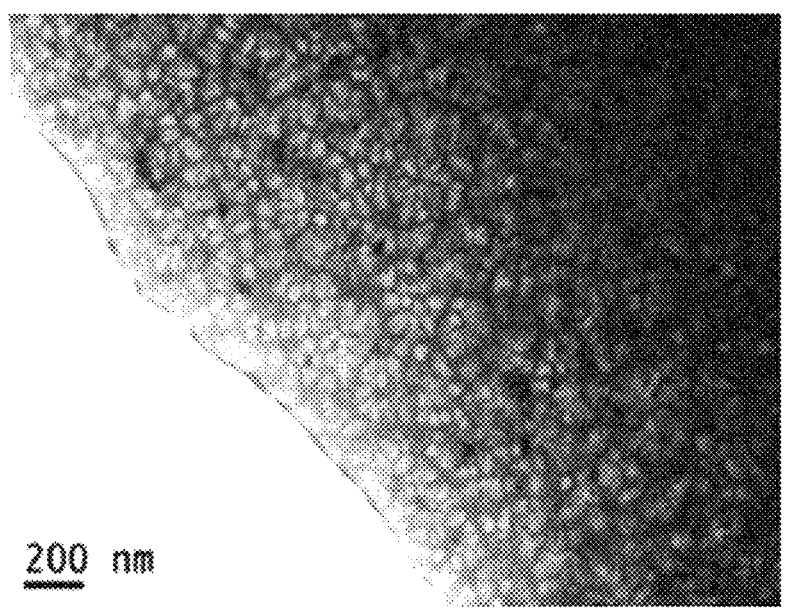
Figure 3:
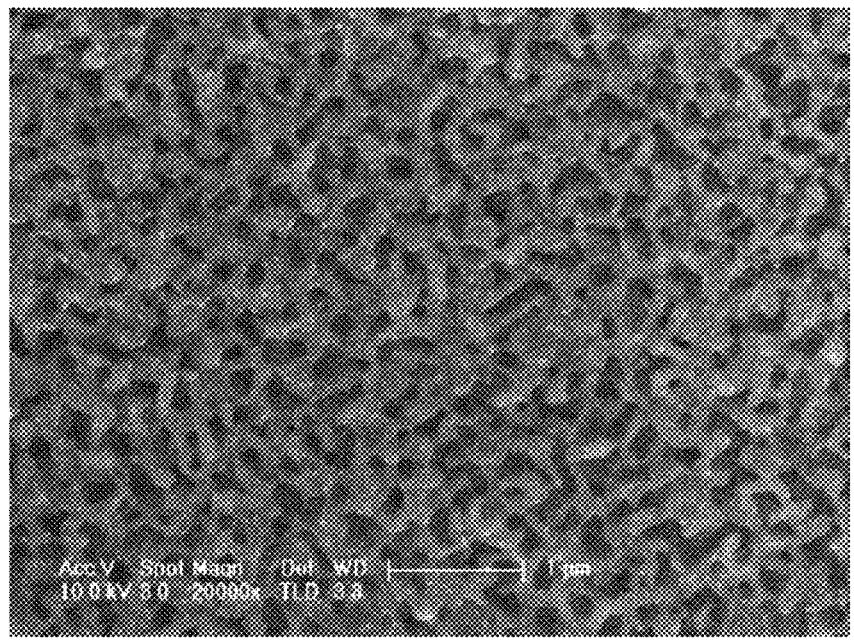

The SEM and TEM analyses were performed on the prepared negative electrode active materials. FIG. 1 is an SEM image of the negative electrode active material prepared in Example 1 (with a magnification of 40,000 times), and FIG. 2 is a TEM image of the active material. A bright region observed in FIG. 2 represents active silicon constituting the phase A (average particle size: approximately 50 μm). As shown in FIG. 2, it was revealed that the active silicon of the phase A was uniformly surrounded by the alloy matrix (Si—Ti—Fe) observed to be a dark region as shown in FIG. 2. Also, FIG. 3 is an SEM image of the negative electrode active material prepared in Example 2 (with a magnification of 20,000 times). As shown in FIG. 3, it was confirmed that the active silicon having an average particle diameter of approximately 200 nm was uniformly formed in the negative electrode active material prepared in Example 2, and a band of a Si—Ti—Fe ternary alloy matrix surrounded the active silicon.

2. XRD Analysis

Figure 4:
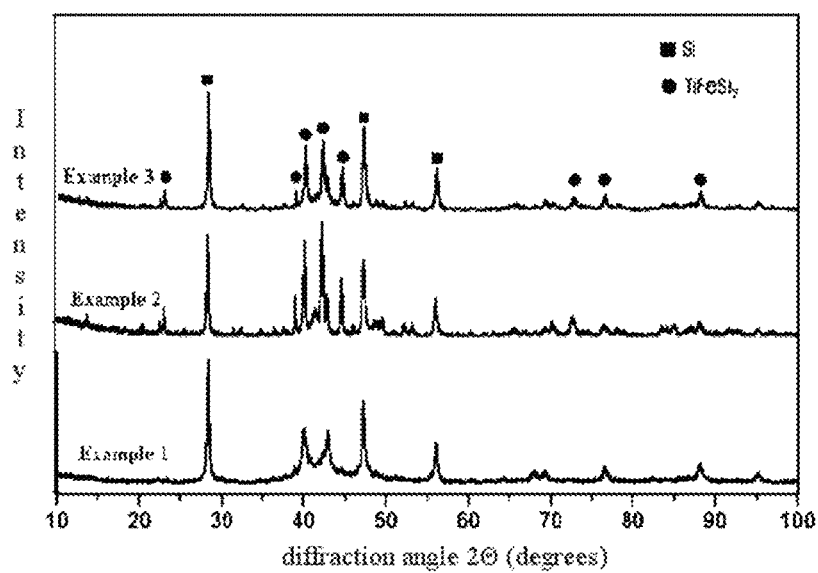
FIG. 4 shows the XRD results obtained by measuring the negative electrode active materials.

The Cu kα-ray XRD measurements were performed on the negative electrode active materials prepared in Examples 1 to 3. The results are shown in FIG. 4. In this analysis, the measurement angle was in a range of 10° to 100°, and the measuring rate was set to 4° per minute. As shown in FIG. 4, it could be seen that the peaks (■) derived from the active silicon and the peaks (●) derived from the Si—Ti—Fe alloy were observed in the negative electrode active materials prepared in Example 1 to 3, and thus the phase A formed of the active silicon and the phase B formed of the Si—Ti—Fe alloy were present in the active material. Also, the presence of the Si—Ti—Fe alloy was confirmed even when the content of silicon was altered from 67 atom % to 74 atom % while maintaining Ti and Fe at an atomic ratio of 1:1.

3. Measurement of Capacity and Cycle Lifespan Property

Figure 5:
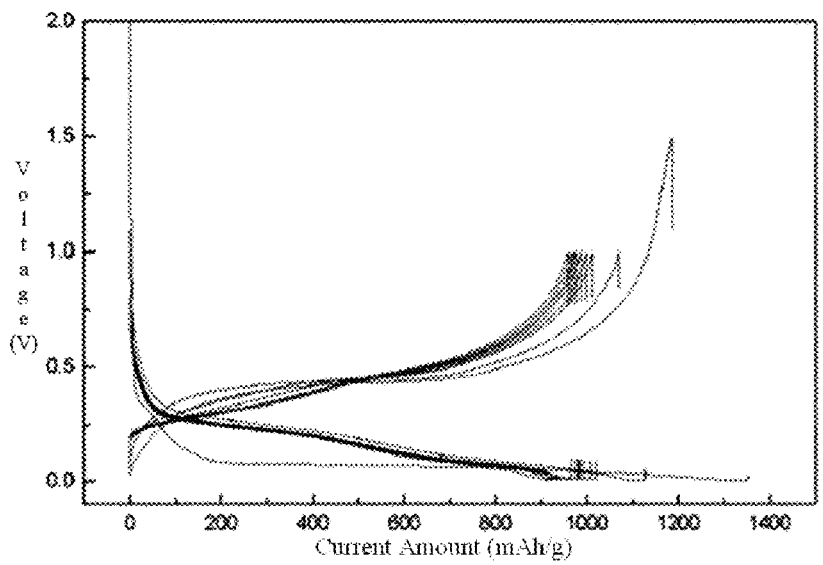
FIG. 5 is a graph illustrating the electrochemical properties of the negative electrode active materials prepared in Examples.
Figure 6:
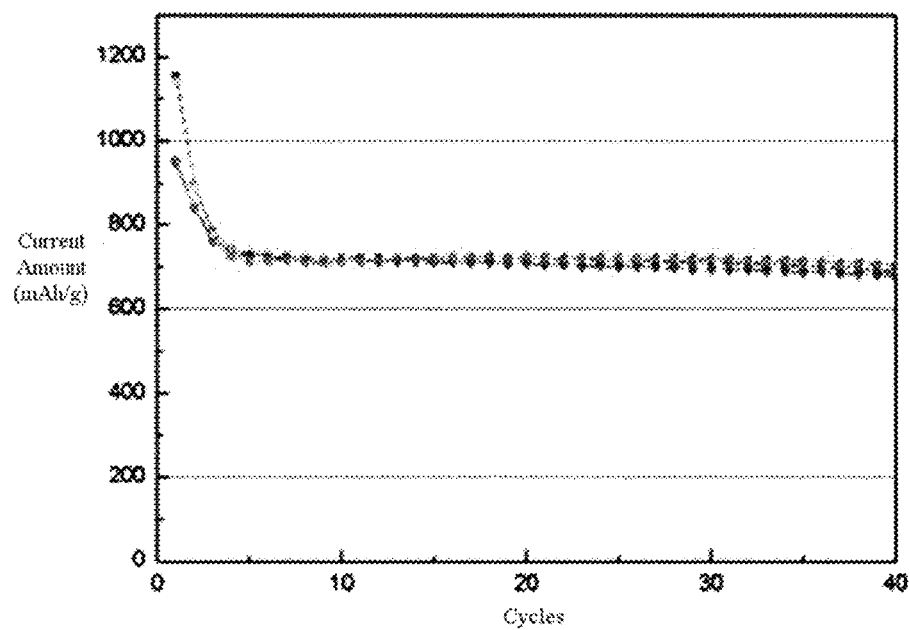
FIG. 6 is a graph illustrating the cycle lifespan properties of the negative electrode active materials prepared in Examples.

A pole plate was manufactured using a quenched ribbon prepared in Example 2, and coin cells were evaluated. The results are shown in FIGS. 5 and 6. In the manufacture of the pole plate in a coin shape, an active material, a conducting agent (Super P-based conducting agent) and a binder (PI-based binder) was mixed at a mixing ratio of 86.6:3.4:10 (active material:conducting agent:binder) (based on the weight). The manufactured pole plate was repeatedly charged/discharged, once at 0.1 C, and then 10 times at 0.5 C, and then measured for voltage and current quantity. In this case, the charge/discharge method was performed according to a method of charging/discharging an active material for lithium secondary batteries as is widely known in the related art. As shown in FIGS. 5 and 6, it could be seen that the voltage and current quantity were substantially uniformly maintained after the repeated charge/discharge cycles, thereby enabling a reversible charge/discharge cycle to be performed. Also, FIG. 6 shows the results obtained by measuring a change in capacity according to the number of cycles after the negative electrode active material prepared in Example 2 was repeatedly charged/discharged, once at 0.1 C, and then 50 times at 0.5 C. As shown in FIG. 6, it could be seen that the discharging capacity was uniformly maintained after the repeated charge/discharge cycles.

4. DCP and Ex Situ XRD Analysis

Figure 7:
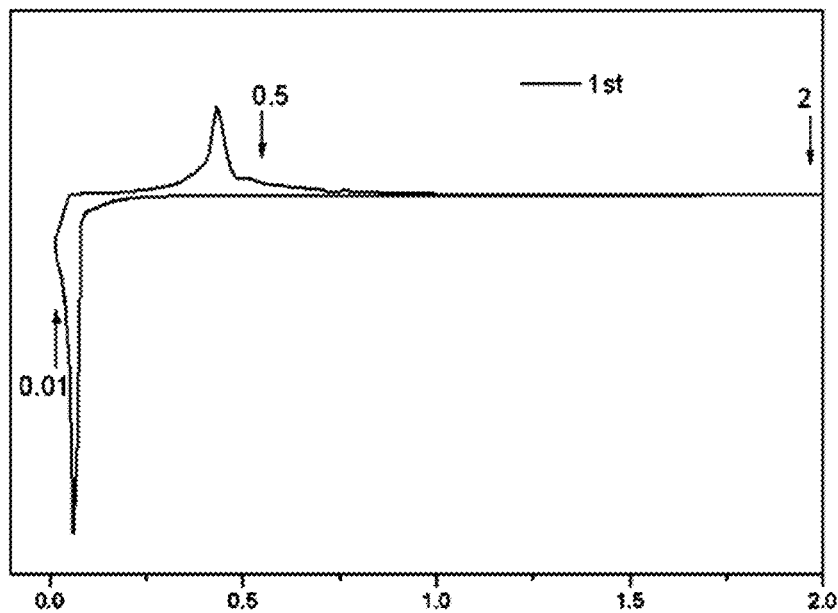
FIG. 7 is a graph illustrating the response potentials of the negative electrode active materials prepared in Examples during a charge/discharge cycle, as analyzed through a differential capacity plot (DCP)
Figure 8:
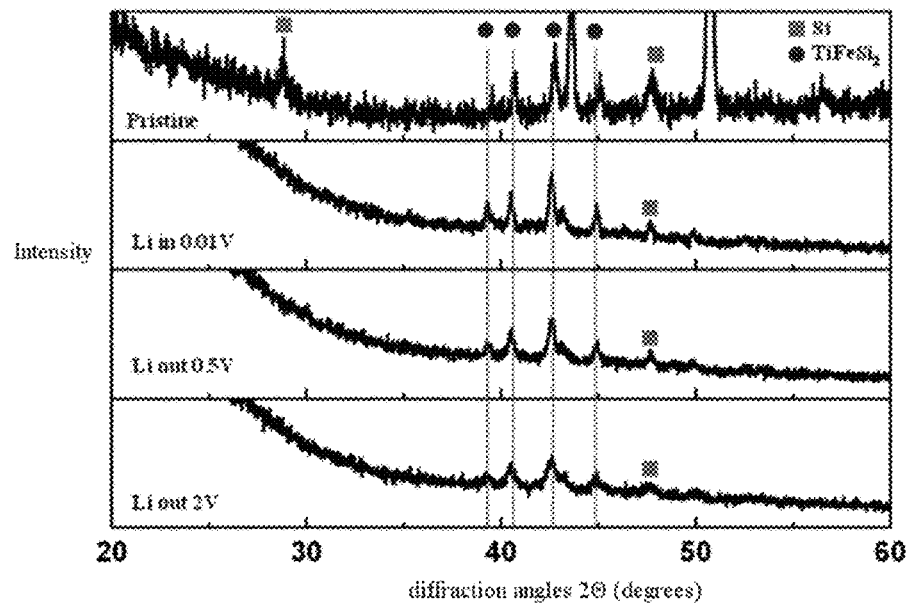
FIG. 8 is a graph illustrating the phase transitions of the negative electrode active materials prepared in Examples during a charge/discharge cycle, as analyzed through ex situ XRD.

A coin cell was manufactured in the same manner as performed for the analyses of FIGS. 5 and 6, using the quenched ribbon prepared in Example 2. Thereafter, to check reactivity of the metal matrix with the active silicon and lithium, a DCP was drawn from the charging/discharging results to determine an electric potential at which a reaction took place. Then, the observed electric potential was selected to perform an ex situ XRD analysis at a corresponding electric potential (measurement angle: 20° to 60°). The results are shown in FIGS. 7 and 8. In this case, the charging/discharging conditions were set as follows, and the other conditions were set based on a typical method of charging/discharging an active material for lithium secondary batteries.

<Charging/Discharging Conditions>

First cycle: Charged in CCCV mode at 0.1 C and 0.005 V/discharged at 0.1 C in CC mode Second cycle: Charged in CCCV mode at 0.2 C and 0.005 V/discharged at 0.2 C in CC mode $3^{rd}$ to $100^{th}$ cycles: Charged at 0.5 C in CCCV mode/discharge at 0.5 C in CC mode From the results as shown in FIGS. 7 and 8, it could be seen that the active silicon of the phase A reacted with lithium, but the Si—Ti—Fe alloy constituting the metal matrix did not show a change in composition due to deintercalation of lithium ions. More particularly, FIG. 8 shows the ex situ XRD peaks (pristine) before a charge/discharge cycle and the ex situ XRD peaks (Li in 0.01 V, Li out 0.5 V, and Li out 2 V) when a charge/discharge cycle was performed once. As shown in FIG. 8, it could be seen that the peaks at diffraction angles (2Θ) of approximately 28.8° and approximately 47.8° which were the peaks derived from the active silicon of the phase A (indicated by filled red squares in FIG. 8) were continuously changed during the charge/discharge cycles, but the peaks (indicated by filled blue circles in FIG. 8) other than the peaks derived from the active silicon were observed to have substantially the same peak area at substantially the same diffraction angle during the charge/discharge cycles.

5. Measurement of Vickers Hardness

To evaluate the hardness property when the metal matrix constituting the phase B included and did not include silicon, the analysis was performed as follows. First, silicon (Si), titanium (Ti) and iron (Fe) were mixed at a predetermined ratio (Si:Ti:Fe=50%:25.8%:24.2%) (based on atom %), and the resulting mixture was melted under argon gas using an arc melting method, thereby preparing a Si—Ti—Fe alloy matrix (Sample 1). In a separate way, a mixture obtained by mixing titanium (Ti) and nickel (Ni) at a predetermined ratio (Ti:Ni=50%:50%) (based on atom %) was also subjected to an arc melting method in the same manner as described above, thereby preparing a Ti—Ni alloy matrix (Sample 2). Thereafter, the samples 1 and 2 were polished to prepare specimens, and measured for Vickers hardness at loads of 100 gf, 200 gf, 300 gf and 500 gf using a Vickers hardness testing machine. The results are summarized in the following Table 1. Specific methods used to evaluate the prepared specimens and measure the Vickers hardness were based on typical methods.

TABLE 1

|  | 100 gf | 200 gf | 300 gf | 500 gf |
| --- | --- | --- | --- | --- |
| Sample 1 (Hv) | 1022.7 | 1049.5 | 1047.1 | 1049.6 |
| Sample 2 (Hv) | 313.6 | 343.6 | 350.5 | 347.4 |

Figure 9:
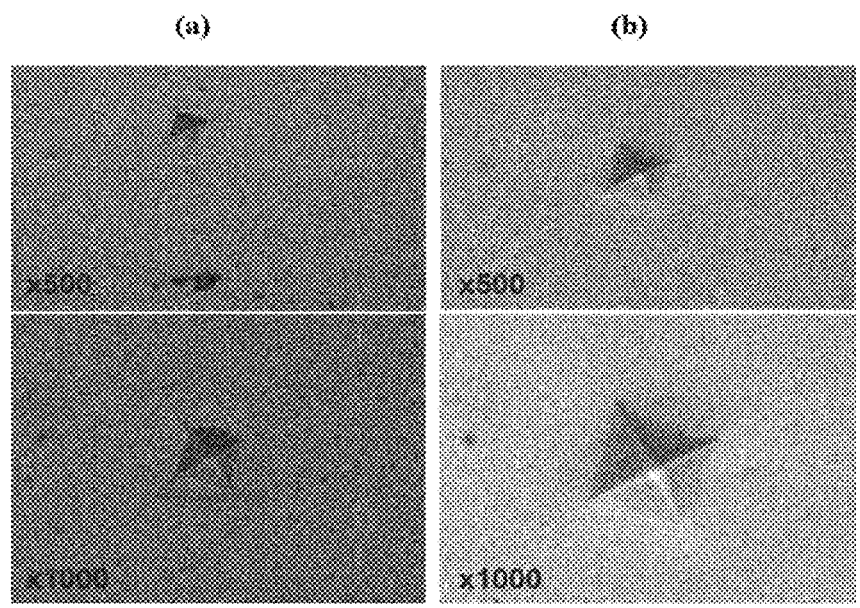
FIG. 9 is a diagram showing the measurement results of the Vickers intensities of alloy matrixes prepared in Examples and Comparative Example.

From the results as listed in Table 1, it could be seen that the sample 1 including silicon as a constituent element showed excellent hardness, compared with the alloy (Ti—Ni) of the sample 2 that was a high-toughness alloy widely used in the related art. FIG. 9 shows samples after their hardness was measured, showing images taken of the sample 1 in the left panel (a) and images taken of the sample 2 in the right panel (b). As shown in FIG. 9, it was seen that the sample 1 had a higher embrittlement property than sample 2 since cracks were observed around a pressed region after the hardness was measured.

6. Evaluation of Embrittlement Property

The embrittlement property was evaluated using the active materials prepared in Example 2 and Comparative Example 1. More particularly, each of the active materials was milled with an increasing period of time using a ball mill machine (average particle size before milling: approximately 400 μm to 1 mm). At the same time, particle sizes of the active materials were measured ($D_{50}$ value). In this case, the milling conditions were set as follows, and the particle size was measured using a typical method known in the related art.

<Milling Condition>

Ball: zirconia bead (diameter: 5 mm)

Mixing ratio: 1 kg of balls were mixed with 40 g of an active material

Milling rate: 150 rpm

The measurement results are summarized in the following Table 2.

TABLE 2

| | Milling time (hr) | | | |
|---|---|---|---|---|
| | 2 | 6 | 24 | 72 |
| Example 2 ($D_{50}$, μm) | 28.1 | 16.24 | 8.8 | 6.46 |
| Comparative Example 1 ($D_{50}$, μm) | 43.35 | 33.4 | 18.9 | 13.73 |

From the results as listed in Table 2, it could be seen that an active material powder having a $D_{50}$ value of 10 μm or less was easily prepared by milling the active material for 24 hours in the case of Example 2 in which the alloy matrix included silicon, but an active material powder having a $D_{50}$ value of 10 μm or less was not obtained after the active material of Comparative Example 2 was milled for 72 hours. As seen from the measurement results of the Vickers hardness, it could be seen that the negative electrode active material of the present invention showed an embrittlement property, and thus was able to be very easily milled into a powder, compared with that of Comparative Example 1.

7. Evaluation of Electric Conductivity

During the milling process performed to evaluate the embrittlement property, a powder of the active material having a $D_{50}$ value of 13 μm was taken and measured for electric conductivity with an increasing load of 4 kN to 20 kN using a typical powder resistivity meter. The results are summarized in the following Table 3.

TABLE 3

| | | | | ICAP PS 50 min_$D_{50}$ = 13 μm | | | |
|---|---|---|---|---|---|---|---|
| Sample Name | | | | Volume | | | |
| No | Load (kN) | Pressure (MPa) | Thickness (mm) | RCF | Resistance (Ohm-cm) | Resistivity (Ohm-cm) | Conductivity (S/cm) | Density (g/cc) |
| 1 | 4.00 | 12.73 | 6.63 | 2.330 | 4.583E−02 | 7.080E−02 | 1.412E+01 | 2.192E+00 |
| 2 | 8.00 | 25.46 | 6.38 | 2.397 | 2.364E−02 | 3.615E−02 | 2.766E+01 | 2.278E+00 |
| 3 | 12.00 | 38.20 | 6.24 | 2.436 | 1.649E−02 | 2.507E−02 | 3.989E+01 | 2.329E+00 |
| 4 | 16.00 | 50.93 | 6.13 | 2.467 | 1.297E−02 | 1.961E−02 | 5.098E+01 | 2.371E+00 |
| 5 | 20.00 | 63.66 | 6.04 | 2.492 | 1.076E−02 | 1.620E−02 | 6.175E+01 | 2.406E+00 |

From the results as listed in Table 3, it was revealed that the negative electrode active material according to one exemplary embodiment of the present invention had an excellent electric conductivity of 6.175E+01 S/cm even when the active material was present at a load of 20 kN. Therefore, although cracks on the active material were caused, and thus the active material was ground into powder during a charge/discharge cycle, the negative electrode active material itself showed the excellent electric conductivity, thereby inhibiting an electrical short circuit from being formed between the active materials.

8. Observation of Pole Plate after Charge/Discharge Cycle

Figure 10:
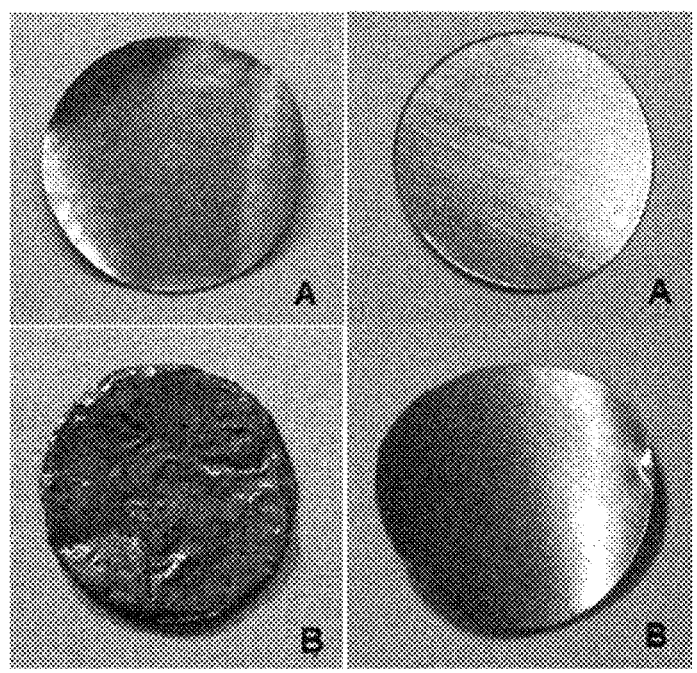
FIG. 10 is an image showing the appearances of pole plates formed of the active materials prepared in Examples and Comparative Example, as observed after a charge/discharge cycle.

A pole plate was manufactured in the same manner as in the DCP and ex situ XRD analyses, and then charged/discharged. A coin cell was disassembled after the pole plate was repeatedly charged/discharged 10 times. Then, it was observed whether the pole plate was deformed. FIG. 10 is a diagram showing the observation results. Here, A in the left panel of FIG. 10 represents an initial state of a pole plate formed of the active material prepared in Comparative Example 1, and B in the left panel of FIG. 10 represents a state of the pole plate after the charge/discharge cycle. Also, A in the right panel of FIG. 10 represents an initial state of a pole plate formed of the active material prepared in Example 2, and B in the right panel of FIG. 10 represents a state of the pole plate after the charge/discharge cycle. As shown in FIG. 10, it could be seen that a base material was not substantially deformed even after the pole plate formed of the active material prepared in Example 2 was charged/discharged 10 times, but a base material was severely deformed when the pole plate formed of the active material prepared in Comparative Example 1 was charged/discharged 10 times. Although not limited in theory, the active material of Comparative Example 1 including a high-intensity matrix having excellent softness was not easily broken down or milled into a powder after the repeated charge/discharge cycles, which made it difficult to effectively use the cavities in the pole plate, and led to extremely severe expansion of the pole plate expansion. Therefore, the base material was severely deformed in the pole plate formed of the active material of Comparative Example 1. On the other hand, when the alloy matrix having high electric conductivity and showing an embrittlement property was employed in the active material of Example 2, deformation of the base material was considered to be suppressed since the active material was broken down during the charge/discharge cycles and fine powder of the active material was re-arranged into the cavities in the pole plate.

From the results as described above, it could be seen that, when the active material according to exemplary embodiments of the present invention is actually applied to cells, deformation of a separator and a positive electrode may be effectively prevented, and expansion of a cell itself and a decrease in lifespan of the cell may be inhibited.

The present invention can provide a negative electrode active material capable of maintaining excellent cell efficiency and lifespan while showing high-capacity properties, and a secondary battery manufactured using the same.

While the invention has been shown and described with reference to certain exemplary embodiments thereof, it will be understood by those skilled in the art that various changes in form and details may be made therein without departing from the scope of the invention as defined by the appended claims.

What is claimed is:

1. A negative electrode active material which is represented by the following Forumla 1, and which comprises
   a phase A including active silicon; and
   a phase B having a metal alloy matrix including silicon and
      a transition metal, wherein the active silicon of the phase A forms a core and the alloy matrix of the phase B surrounds the core of the active silicon of the phase A, wherein peaks other than a peak derived from the active silicon of the phase A observed by an ex situ XRD analysis before a charge/discharge cycle are also observed by an ex situ XRD analysis after the charge/discharge cycle, the Formula 1 being aSi-bTi-cFe wherein the sum of a, b, and c is 100 atom %, a is 67 atom % to 74 atom %, b is from 13 atom % to 16.5 atom %, and c is 13 atom % to 16.5 atom %.

2. The negative electrode active material of claim 1, wherein the phase A is formed of a single phase of the active silicon.

3. The negative electrode active material of claim 1, wherein the active silicon of the phase A has an average particle diameter of 1,000 nm or less.

4. The negative electrode active material of claim 1, which has an electric conductivity of $5 \times 10^1$ S/cm or more, as measured at a load of 20 kN.

5. A secondary battery comprising:
   a positive electrode;
   a negative electrode including the active material defined in claim 1; and
   an electrolyte.

6. The secondary battery claim 5, wherein the positive electrode includes a lithiated intercalation compound, elemental sulfur or a sulfur compound.

7. The secondary battery claim 5, wherein the electrolyte includes a non-aqueous organic solvent and a lithium salt.

8. The secondary battery claim 5, which is formed in a tubular, horn, coin or pouch shape.

* * * * *